(12) United States Patent
Corbett

(10) Patent No.: US 7,970,996 B1
(45) Date of Patent: *Jun. 28, 2011

(54) CONCENTRATED PARITY TECHNIQUE FOR HANDLING DOUBLE FAILURES AND ENABLING STORAGE OF MORE THAN ONE PARITY BLOCK PER STRIPE ON A STORAGE DEVICE OF A STORAGE ARRAY

(75) Inventor: Peter F. Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/627,901

(22) Filed: Nov. 30, 2009

Related U.S. Application Data

(63) Continuation of application No. 11/047,079, filed on Jan. 31, 2005, now Pat. No. 7,627,715, which is a continuation of application No. 10/008,497, filed on Nov. 13, 2001, now Pat. No. 6,851,082.

(51) Int. Cl.
*G06F 12/00* (2006.01)
*G06F 13/00* (2006.01)
*G06F 13/28* (2006.01)

(52) U.S. Cl. ...................................... 711/114
(58) Field of Classification Search .................. 711/114
See application file for complete search history.

(56) References Cited

U.S. PATENT DOCUMENTS

| | | |
|---|---|---|
| 3,876,978 A | 4/1975 | Bossen et al. |
| 3,993,862 A | 11/1976 | Karr |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |

(Continued)

FOREIGN PATENT DOCUMENTS

EP 1324200 A2 7/2003

(Continued)

OTHER PUBLICATIONS

Blaum, Mario, et al., Evenodd: An Optimal Scheme for Tolerating Double Disk Failures in RAID Architectures, Computer Architectures News, Association for Computing Machinery, New York, US, vol. 22, No. XP000450355, Apr. 1, 1994.

(Continued)

*Primary Examiner* — Sheng-Jen Tsai
(74) *Attorney, Agent, or Firm* — Cesari and McKenna, LLP

(57) ABSTRACT

A method for constructing an array of storage devices is disclosed. A number of storage devices is selected. Each storage device stores data in data blocks. A redundancy is established, the redundancy being a number of data blocks for a parity block. A plurality of parity sets is established, a parity set having the number of data blocks for a parity block and having a set parity block. The set parity block for each parity set is computed. Each set parity block is stored on one of the data storage devices that does not store one of the data-block members of the parity set, to store more than one parity block on each storage device, with an exception that two parity blocks for the same data storage location are precluded from being stored on the same data storage device.

42 Claims, 6 Drawing Sheets

| Δ DIF IN ROW | D0 | D1 | D2 | D3 | D4 | D5 | D6 | D7 | D8 | D9 | D10 | D11 | D12 | D13 | D14 |
|---|---|---|---|---|---|---|---|---|---|---|---|---|---|---|---|
| 4, 8 | B1,9 | B2,10 | B3,11 | B4,0 | B5,1 | B6,2 | B7,3 | B8,4 | B9,5 | B10,6 | B11,7 | B0,8 | P0 | P1 | P2 |
| 1, 11 | B2,3 | B3,4 | B4,5 | B5,6 | B6,7 | B7,8 | B8,9 | B9,10 | B10,11 | B11,0 | B0,1 | B1,2 | P3 | P4 | P5 |
| 5, 7 | B4,11 | B5,0 | B6,1 | B7,2 | B8,3 | B9,4 | B10,5 | B11,6 | B0,7 | B1,8 | B2,9 | B3,10 | P6 | P7 | P8 |
| 2, 10 | B8,10 | B9,11 | B10,0 | B11,1 | B0,2 | B1,3 | B2,4 | B3,5 | B4,6 | B5,7 | B6,8 | B7,9 | P9 | P10 | P11 |

800

U.S. PATENT DOCUMENTS

| | | | |
|---|---|---|---|
| 4,547,882 A | 10/1985 | Tanner | |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |
| 4,761,785 A | 8/1988 | Clark et al. | |
| 4,775,978 A | 10/1988 | Hartness | |
| 4,796,260 A | 1/1989 | Schilling et al. | |
| 4,817,035 A | 3/1989 | Timsit | |
| 4,825,403 A | 4/1989 | Gershenson et al. | |
| 4,837,680 A | 6/1989 | Crockett et al. | |
| 4,847,842 A | 7/1989 | Schilling | |
| 4,849,929 A | 7/1989 | Timsit | |
| 4,849,974 A | 7/1989 | Schilling et al. | |
| 4,849,976 A | 7/1989 | Schilling et al. | |
| 4,870,643 A | 9/1989 | Bultman et al. | |
| 4,899,342 A | 2/1990 | Potter et al. | |
| 4,989,205 A | 1/1991 | Dunphy, Jr. et al. | |
| 4,989,206 A | 1/1991 | Dunphy, Jr. et al. | |
| 5,077,736 A | 12/1991 | Dunphy, Jr. et al. | |
| 5,088,081 A | 2/1992 | Farr | |
| 5,101,492 A | 3/1992 | Schultz et al. | |
| 5,128,810 A | 7/1992 | Halford | |
| 5,148,432 A | 9/1992 | Gordon et al. | |
| RE34,100 E | 10/1992 | Hartness | |
| 5,163,131 A | 11/1992 | Row et al. | |
| 5,166,936 A | 11/1992 | Ewert et al. | |
| 5,179,704 A | 1/1993 | Jibbe et al. | |
| 5,202,979 A | 4/1993 | Hillis et al. | |
| 5,208,813 A | 5/1993 | Stallmo | |
| 5,210,860 A | 5/1993 | Pfeffer et al. | |
| 5,218,689 A | 6/1993 | Hotle | |
| 5,233,618 A | 8/1993 | Glider et al. | |
| 5,235,601 A | 8/1993 | Stallmo et al. | |
| 5,237,658 A | 8/1993 | Walker et al. | |
| 5,257,367 A | 10/1993 | Goodlander et al. | |
| 5,271,012 A | 12/1993 | Blaum et al. | |
| 5,274,799 A | 12/1993 | Brant et al. | |
| 5,305,326 A | 4/1994 | Solomon et al. | |
| 5,351,246 A | 9/1994 | Blaum et al. | |
| 5,390,327 A | 2/1995 | Lubbers et al. | |
| 5,410,667 A | 4/1995 | Belsan et al. | |
| 5,537,567 A | 7/1996 | Galbraith et al. | |
| 5,574,851 A | 11/1996 | Rathunde | |
| 5,579,475 A | 11/1996 | Blaum et al. | |
| 5,623,595 A | 4/1997 | Bailey | |
| 5,634,096 A | 5/1997 | Baylor et al. | |
| 5,657,439 A | 8/1997 | Jones et al. | |
| 5,657,468 A | 8/1997 | Stallmo et al. | |
| 5,720,025 A | 2/1998 | Wilkes et al. | |
| 5,774,643 A | 6/1998 | Lubbers et al. | |
| 5,805,788 A | 9/1998 | Johnson | |
| 5,812,753 A | 9/1998 | Chiariotti | |
| 5,819,292 A | 10/1998 | Hitz et al. | |
| 5,862,158 A | 1/1999 | Baylor et al. | |
| 5,884,098 A | 3/1999 | Mason, Jr. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,052,759 A | 4/2000 | Stallmo et al. | |
| 6,079,028 A | 6/2000 | Ozden et al. | |
| 6,092,215 A | 7/2000 | Hodges et al. | |
| 6,138,125 A | 10/2000 | DeMoss | |
| 6,138,126 A | 10/2000 | Hitz et al. | |
| 6,138,201 A | 10/2000 | Rebalski | |
| 6,154,853 A | 11/2000 | Kedem | |
| 6,158,017 A | 12/2000 | Han et al. | |
| 6,223,300 B1 | 4/2001 | Gotoh | |
| 6,223,323 B1 | 4/2001 | Wescott | |
| 6,247,157 B1 | 6/2001 | Edirisooriya | |
| 6,289,356 B1 | 9/2001 | Hitz et al. | |
| 6,370,616 B1 | 4/2002 | Callison et al. | |
| 6,453,428 B1 | 9/2002 | Stephenson | |
| 6,513,093 B1 | 1/2003 | Chen et al. | |
| 6,529,997 B1 | 3/2003 | Debiez et al. | |
| 6,532,548 B1 | 3/2003 | Hughes | |
| 6,546,458 B2 | 4/2003 | Milligan et al. | |
| 6,557,123 B1 | 4/2003 | Wiencko et al. | |
| 6,571,326 B2 | 5/2003 | Spiegel et al. | |
| 6,581,185 B1 | 6/2003 | Hughes | |
| 6,671,772 B1 | 12/2003 | Cousins | |
| 6,711,665 B1 | 3/2004 | Akerib et al. | |
| 6,742,137 B1 | 5/2004 | Frey, Jr. | |
| 6,779,095 B2 | 8/2004 | Selkirk et al. | |
| 6,851,082 B1 | 2/2005 | Corbett | |
| 6,904,556 B2 | 6/2005 | Walton et al. | |
| 6,993,701 B2 | 1/2006 | Corbett et al. | |
| 7,073,115 B2 | 7/2006 | English et al. | |
| 7,080,278 B1 | 7/2006 | Kleiman et al. | |
| 7,203,892 B2 | 4/2007 | Corbett et al. | |
| 7,328,305 B2 | 2/2008 | Kleiman et al. | |
| 7,346,831 B1 | 3/2008 | Corbett | |
| 7,409,625 B2 | 8/2008 | Corbett et al. | |
| 7,454,445 B2 | 11/2008 | Lewis et al. | |
| 7,627,715 B1 * | 12/2009 | Corbett | 711/114 |
| 2002/0124137 A1 | 9/2002 | Ulrich et al. | |
| 2002/0138559 A1 | 9/2002 | Ulrich et al. | |
| 2002/0161972 A1 | 10/2002 | Talagala et al. | |
| 2002/0178162 A1 | 11/2002 | Ulrich et al. | |
| 2003/0074527 A1 | 4/2003 | Burton et al. | |
| 2003/0135514 A1 | 7/2003 | Patel et al. | |

FOREIGN PATENT DOCUMENTS

| | | |
|---|---|---|
| WO | WO-01/13236 A1 | 2/2001 |
| WO | WO-02/29539 A2 | 4/2002 |

OTHER PUBLICATIONS

Blaum, Mario, et al., Evenodd: An Efficient Scheme for Tolerating Double Disk Failures in RAID Architectures, IEEE Transactions on Computers, vol. 44, No. 2, Feb. 1995, pp. 192-202.

Copeland, George, et al., A Comparison of High-Availability Media Recovery techniques, in Proc. ACM-SIGMOD Int. Conf. Management of Data, 1989.

Courtright II, William V., et al., RAIDframe: A Rapid Prototyping Tool for RAID Systems, Computer Science Technical Report CMU-CS97-142, Carnegie Mellon University, Pittsburgh, PA 15213, Jun. 4, 1997.

Evans The Tip of the Iceberg:RAMAC Virtual Array—Part I, Technical Support, Mar. 1997, pp. 1-4.

Hitz, David, TR3002 File System Design for a NFS File Server Appliance, Network Appliance, Inc.

Lee, Edward K., et al., The Performance of Parity Placements in Disk Arrays, IEEE Transactions on Computers, vol. 42 No. 6, Jun. 1993, 14 pages.

Limited Distributed DASD Checksum, A RADI Hybrid, IBW Technical Disclosure Bulletin, IBM Corp. New York, US vol. 35. No. 4A, XP000314813, Sep. 1, 1992.

Menon, Jai, et al., Methods for Improved Update Performance of Disk Arrays, IBM Almaden Research Center, IEEE, Jan. 1992, 10 pages.

Menon, Jai, et al., Floating Parity and Data Disk Arrays, Journal of Parallel and Distributed Computing, Boston: Academic Press. Inc., vol. 17 No. 1 and 2, Jan./Feb. 1993, 13 pages.

Microsoft Computer Dictionary, 5th Edition, 2002, p. 211.

Scheuermann, Peter, et al., Data Partitioning and Load Balancing in Parallel Disk Systems, the VLDB Journal, vol. 7, Springer-Verlag, Copyright Feb. 1998, 19 pages.

Stanek, William R., Microsoft Windows 2000 Server: Administering Volume Sets and RAID Arrays, Jan. 10, 2006, (http://www.microsoft.com/technet/prodtechnol/windows2000serv/maintain/operate/11w2kada.mspx), (Printed 1999).

Stodolsky, Daniel, et al., Parity Logging Overcoming the Small Write Problem in Redundant Disk Array, School of Computer Science and Department of Electrical and Computer Engineering, Carnegie Mellon University, IEEE, May 1993, 12 pages.

Weikum, Gerhard, et al., Dynamic File Allocation in Disk Arrays, ETH Zurich, Department of Computer Science Information Systems—Databases, ACM SIGMOD Record, vol. 20, Issue 2, Jun. 1991, 10 pages.

PCT Notification of Transmittal of the International Search Report and the Written Opinion of the International Searching Authority, or the Declaration, International Application No. PCT/US2006/047647, International Filing Date: Dec. 14, 2006: Date of Mailing: Mar. 3, 2009, 15 pages.

Chin-Shing Tau et al. "Efficient Parity Placement Schemes for Tolerating Triple Disk Failures in RAID Architectures" Proc. 17th Int Conf on Advanced Information Networking and Applications. Mar. 27, 2003; 6 pages.

Mario Blaum "A Family of MDS Array Codes with Minimal Number of Encoding Operations" Information Theory, 2006 IEEE International Symposium on, IEEE, PI; Jul. 1, 2006, pp. 2784-2788.

Huang, Cheng "Efficient and Effective Schemes for Streaming Media Delivery," Washington University: Server Institute of Technology, Department of Computer Science, Aug. 2005, p. 1-104.

Anvin, Peter H, "The Mathematics of RAID 6," Dec. 2004.

Auspex 4Front NS2000, System Architecture, Network-Attached Storage For a New Millennium, Auspex Engineering Technical Report 24, Jan. 1999.

Bestavros, Azer, et al., Reliability and Performance of Parallel Disks, Technical Memorandum 45312-891206-01TM, AT&T, Bell Laboratories, Department 45312, Holmdel, NJ, Dec. 1989.

Bitton, Dina, Disk Shadowing, Proceedings of the 14th VLDB Conference, LA, CA (1988).

Bultman, David L., High Performance SCSI Using Parallel Drive Technology, In Proc. BUSCON Conf., pp. 40-44, Anaheim, CA, Feb. 1988.

Chen, Peter et al., Two Papers on RAIDs. Technical Report, CSD-88-479, Computer Science Division, Electrical Engineering and Computer Sciences, University of California at Berkeley (1988).

Chen, Peter M., et al., An Evaluation of Redundant Arrays of Disks Using an Amdahl 5890, Performance Evaluation, pp. 74-85, 1990—check to see if exact same copy as one in WAFL.

Chen, Peter M.., et al, Maximizing Performance in a Striped Disk Array, Proc. 1990 ACM SIGARCH 17th Intern. Symp. on Comp. Arch., Seattle, WA, May 1990, pp. 322-331.

Chen, Peter M., et al., Raid:High Performance, Reliable Secondary Storage, ACM Computing Surveys, 26(2):145-185, Jun. 1994.

Chervenak, Ann L., Performance Measurement of the First RAID Prototype, Technical Report UCB/CSD 90/574, Computer Science Division (EECS), University of California, Berkeley, May 1990.

Copeland, George, et al., "A Comparison of High-Availability Media Recovery techniques," in Proc. ACM-SIGMOD Int. Conf. Management of Data, 1989.

Courtright II, William V., et al., RAIDframe: A Rapid Prototyping Tool for RAID Systems, Computer Science Technical Report CMU-CS97-142, Carnegie Mellon University, Pittsburgh, PA 15213, Jun. 4, 1997.

Evans The Tip of the Iceberg:RAMAC Virtual Array—Part I, Technical Support, Mar. 1997, pp. 1-4.

Gibson, Garth A., et al., Coding Techniques for Handling Failures in Large Disk Arrays, Technical Report UCB/CSD 88/477, Computer Science Division, University of California, (Jul. 1988.).

Gibson, Garth A., et al., Failure Correction Techniques for Large Disk Arrays, In Proceedings Architectural Support for Programming Languages and Operating Systems, Boston, Apr. 1989, pp. 123-132.

Gibson, Garth A., et al., Strategic Directions in Storage I/O Issues in Large-Scale Computing, ACM Computing Survey, 28(4):779-93, Dec. 1996.

Goldick, Jonathan S., et al., Multi-resident AFS: An Adventure in Mass Storage, In Proceedings of the 1995 USENIX Technical Conference, pp. 47-58, Jan. 1995.

Graham, Susan L., et al., Massive Information Storage, Management, and Use, (NSF Institutional Infrastructure Proposal), Technical Report No. UCB/CSD 89/493, Jan. 1989.

Gray, Jim et al., Parity striping of disc arrays: Low-Cost Reliable Storage with Acceptable Throughput. In Proceedings of the 16th Very Large Data Bases Conference, pp. 148-161, Brisbane, Australia, 1990.

Grimes, DW Martinez, Two Dimensional Parity Error Correction Procedure, IBM Technical Disclosure Bulletin 2686-2689, Oct. 1982.

Grimes, DW Martinez, Vertical Parity Generator for Two Dimensional Parity, IBM Technical Disclosure Bulletin 2682-2685, Oct. 1982.

Hellerstein, Lisa, et al,. Coding Techniques for Handling Failures in Large Disk Arrays. In Algorithmica vol. 2, Nr. 3, 182-208 (1994).

Hughes, James, et al., High Performance RAIT, Tenth NASA Goddard Conference on Mass Storage Systems and Technologies and Nineteenth IEEE Symposium on Mass Storage Systems, Adelphi, Maryland, USA, Apr. 2002.

Johnson, Theodore, et al, Tape Group Parity Protection, IEEE Symposium on Mass Storage, pp. 72-79, Mar. 1999.

Katz, Randy H. et al., Disk System Architectures for High Performance Computing, undated.

Kent, Jack et al., Optimizing Shadow Recovery Algorithms, IEEE Transactions on Software Engineering, 14(2):155-168, Feb. 1988.

Kim, Michelle Y., Synchronized Disk Interleaving, IEEE Transactions on Computers, C-35(11):978-988, Nov. 1986.

Kim, Michelle, et al., Asynchronous Disk Interleaving Approximating Access Delays, IEEE Transactions on Computers, vol. 40, No. 7, Jul. 1991, pp. 801-810.

Lawlor, F. D., Efficient Mass Storage Parity Recovery Mechanism, IBM Technical Disclosure Bulletin 24(2):986-987, Jul. 1981.

Lee, Edward K., et al., RAID-II: A Scalable Storage Architecture for High-Bandwidth Network File Service, Technical Report UCB/CSD 92/672, (Feb. 1992).

Li, Don, et al., Authors' Reply, IEEE Transactions on Communications, 46:575, May 1998.

Livny, Miron, et al., Multi-Disk Management Algorithms, In Proceedings of the ACM International Conference on Measurement and Modeling of Computer Systems (SIGMETRICS), pp. 69-77, Banff, Alberta, Canada, May 1987.

Meador, Wes E., Disk Array Systems, Proceedings of COMPCON, 1989, pp. 143-146.

Ng, Spencer, et al., Trade-Offs Between Devices and Paths in Achieving Disk Interleaving, IEEE International Symposium on Computer Architecture, 1988, pp. 196-201.

Ng, Spencer, Some Design Issues of Disk Arrays, Proceedings of COMPCON Spring '89, pp. 137-142. IEEE, 1989.

Park, Arvin, et al., Providing Fault Tolerance in Parallel Secondary Storage Systems, Technical Report CS-TR-057-86, Princeton, Nov. 1986.

Patel, Arvind M., Adaptive Cross-Parity (AXP) Code for a High-Density Magnetic Tape Subsystem, IBM Technical Disclosure Bulletin 29(6):546-562, Nov. 1985.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987).

Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).

Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.

Storagesuite "Performance Without Compromise: The Virtual Storage Architecture,"catalogue, 1997.

Reddy, A. L. Narasimha, et al., An Evaluation of Multiple-Disk I/O Systems, IEEE Transactions on Computers, vol. 38, No. 12, Dec. 1989, pp. 1680-1690.

Schulze, Martin E., Considerations in the Design of a RAID Prototype, Computer Science Division, Department of Electrical Engineering and Computer Sciences, Univ. of CA, Berkley, Aug. 25, 1988.

Schulze, Martin., et al., How Reliable is a RAID?, Proceedings of COMPCON, 1989, pp. 118-123.

Shirriff, Kenneth W., Sawmill:A Logging File System for a High-Performance RAID Disk Array, CSD-95-862, Jan. 1995.

Stonebraker, Michael, et al., The Design of XPRS, Proceedings of the 14th VLDB Conference, LA, CA (1988).

Tanabe, Takaya, et al, Redundant Optical Storage System Using DVD-RAM Library, IEEE Symposium on Mass Storage, pp. 80-87, Mar. 1999.

Tekrom—"About RAID 6".

Tweten, David, Hiding Mass Storage Under UNIX: NASA's MSS-H Architecture, IEEE Symposium on Mass Storage, pp. 140-145, May 1990.

Wilkes, John, et al., The HP AutoRAID hierarchical storage system, ACM Transactions on Computer Systems, Feb. 1996, vol. 14, pp. 108-136.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Fielding et al., (1999) Request for Comments (RFC) 2616, HTTP/1.1, 143 pages.

* cited by examiner

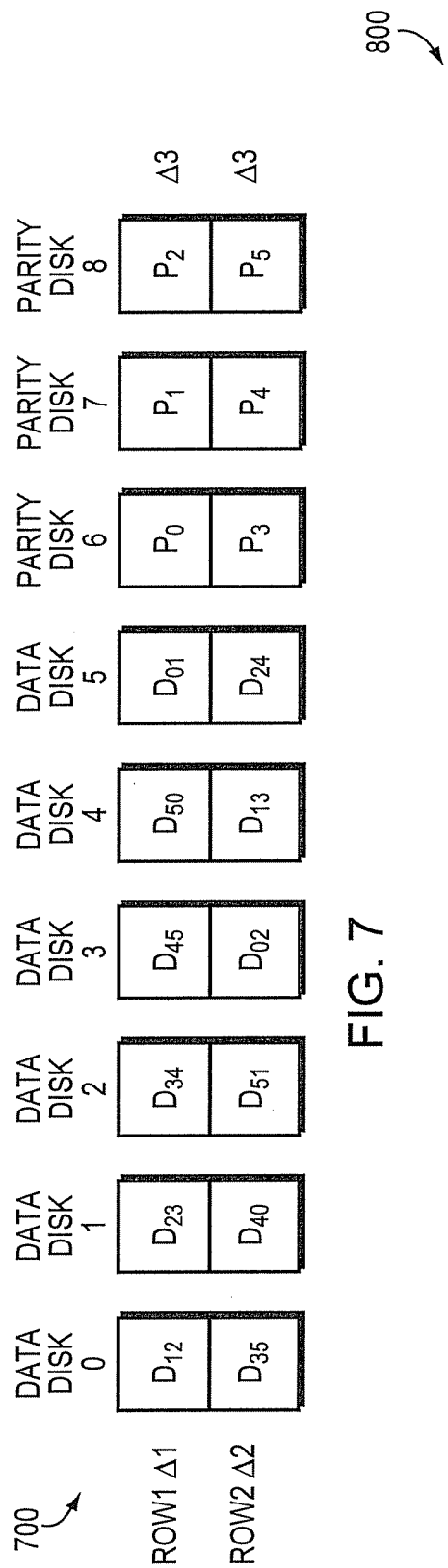

CONCENTRATED PARITY TECHNIQUE FOR HANDLING DOUBLE FAILURES AND ENABLING STORAGE OF MORE THAN ONE PARITY BLOCK PER STRIPE ON A STORAGE DEVICE OF A STORAGE ARRAY

CROSS-REFERENCE TO RELATED APPLICATION

The present application is a continuation of U.S. patent application Ser. No. 11/047,079, filed on Jan. 31, 2005 and now issued as U.S. Pat. No. 7,627,715 on Dec. 1, 2009, titled CONCENTRATED PARITY TECHNIQUE FOR HANDLING DOUBLE FAILURES AND ENABLING STORAGE OF MORE THAN ONE PARITY BLOCK PER STRIPE ON A STORAGE DEVICE OF A STORAGE ARRAY by Peter F. Corbett, which is a continuation of U.S. patent application Ser. No. 10/008,497, filed on Nov. 13, 2001 and now issued as U.S. Pat. No. 6,851,082 on Feb. 1, 2005, of same title and inventorship. Both patents are hereby incorporated by reference herein.

The present invention is related to the following commonly assigned U.S. patent application Ser. No. 10/008,565 titled Parity Assignment Technique for Parity Declustering in a Parity Array of a Storage System, which was filed on even date herewith and is now issued as U.S. Pat. No. 7,346,831 on Mar. 18, 2008, and which application is is hereby incorporated by reference as though fully set forth herein.

FIELD OF THE INVENTION

The present invention relates to arrays of storage systems and, more specifically, to a technique for efficiently reconstructing any one or combination of two failing storage devices of a storage array.

BACKGROUND OF THE INVENTION

A file server is a computer that provides file service relating to the organization of information on writeable persistent storage devices, such memories, tapes or disks of an array. The file server or filer may be embodied as a storage system including a storage operating system that implements a file system to logically organize the information as a hierarchical structure of directories and files on the disks. Each "on-disk" file may be implemented as set of data structures, e.g., disk blocks, configured to store information, such as the actual data for the file. A directory, on the other hand, may be implemented as a specially formatted file in which information about other files and directories are stored.

A storage system may be further configured to operate according to a client/server model of information delivery to thereby allow many clients to access files stored on a server, e.g., the storage system. In this model, the client may comprise an application executing on a computer that "connects" to the storage system over a computer network, such as a point-to-point link, shared local area network, wide area network or virtual private network implemented over a public network, such as the Internet. Each client may request the services of the file system on the storage system by issuing file system protocol messages (in the form of packets) to the system over the network. It should be noted, however, that the storage system may alternatively be configured to operate as an assembly of storage devices that is directly-attached to a (e.g., client or "host") computer. Here, a user may request the services of the file system to access (i.e., read and/or write) data from/to the storage devices.

A common type of file system is a "write in-place" file system, an example of which is the conventional Berkeley fast file system. In a write in-place file system, the locations of the data structures, such as data blocks, on disk are typically fixed. Changes to the data blocks are made "in-place" in accordance with the write in-place file system. If an update to a file extends the quantity of data for the file, an additional data block is allocated.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system, such as a filer, is the Write Anywhere File Layout (WAFL™) file system available from Network Appliance, Inc., Sunnyvale, Calif. The WAFL file system is implemented as a microkernel within an overall protocol stack of the filer and associated disk storage.

The disk storage is typically implemented as one or more storage "volumes" that comprise a cluster of physical storage disks, defining an overall logical arrangement of disk space. Each volume is generally associated with its own file system. The disks within a volume/file system are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

In the operation of a disk array, it is fairly common that a disk will fail. A goal of a high performance storage system is to make the mean time to data loss (MTTDL) as long as possible, preferably much longer than the expected service life of the system. Data can be lost when one or more storage devices fail, making it impossible to recover data from the device. Typical schemes to avoid loss of data include mirroring, backup and parity protection. Mirroring is an expensive solution in terms of consumption of storage resources, such as hard disk drives. Backup does not protect recently modified data. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are equivalent to an exclusive-OR (XOR) logical operation, and the addition and subtraction operations are replaced by XOR operations. The data is then protected against the loss of any of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

As used herein, the term "encoding" means the computation of a redundancy value over a predetermined subset of data blocks, whereas the term "decoding" means the reconstruction of a data or parity block by the same or similar process as the redundancy computation using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

An aspect of parity protection of data is that it provides protection against only a single disk failure within a parity group. These schemes can also protect against multiple disk failures as long as each failure occurs within a different parity group. However, in the case of multiple simultaneous failures within a parity group, no such protection is provided and an unrecoverable loss of data is suffered. Failure of two disks concurrently within a parity group is a fairly common occurrence, particularly because disks "wear out" and because of environmental factors with respect to the operation of the disks. In this context, the failure of two disks concurrently within a parity group is referred to as a "double failure".

A double failure typically arises as a result of a failure to one disk and a subsequent failure to another disk while attempting to recover from the first failure. The recovery or reconstruction time is dependent upon the level of activity of the storage system. That is, during reconstruction of a failed disk, it is desirable that the storage system remain "online" and continue to serve requests (from clients or users) to access (i.e., read and/or write) data. If the storage system is busy serving requests, the elapsed time for reconstruction increases. The reconstruction processing time also increases as the number of disks in the storage system increases. Moreover, the double disk failure rate is proportional to the square of the number of disks in a parity group. However, having small parity groups is expensive, as each parity group requires an entire disk devoted to redundant data.

Accordingly, it is desirable to provide a technique that withstands double failures. This would allow construction of larger disk systems with larger parity groups, while ensuring that even if reconstruction after a single disk failure takes a long time (e.g., a number of hours), the system can survive a second failure. Such a technique would further allow relaxation of certain design constraints on the storage system. For example, the storage system could use lower cost disks and still maintain a high MTTDL. Lower cost disks typically have a shorter lifetime, and possibly a higher failure rate during their lifetime, than higher cost disks. Therefore, use of such disks is more acceptable if the system can withstand double disk failures within a parity group.

A known scheme for protecting against double disk failures is a distributed parity scheme disclosed in U.S. Pat. No. 5,862,158, titled Efficient Method for Providing Fault Tolerance Against Double Device Failures in Multiple Device Systems, by Baylor et al., issued Jan. 19, 1999, which patent is hereby incorporated by reference as though fully set forth herein. This distributed parity scheme, hereinafter referred to as the "Corbett-Park" scheme, provides a way of determining the assignment of each data block to exactly two parity sets, such that all parity sets are the same size. The scheme also allows recovery from any two disk failures using an optimal amount of parity information, equivalent to two disks worth, for any even number of disks 4 or greater, except 8.

The Corbett-Park technique further allows a tradeoff between the optimal amount of parity and the number of data blocks that belong to each parity set, i.e., the number of data blocks XOR'ed to compute each parity block. For a given number of disks n in the is array, a ratio m may be selected, which is the number of data blocks per parity block. Thus, the redundancy is $1/(m+1)$ and the parity overhead is $1/m$, wherein m is restricted such that $2m+2 \leq n$. Within each recurrence of the parity assignment pattern, each disk has m data blocks and one parity block. Without losing generality, assume that the data blocks are in m rows and the parity blocks are in a single row. A stripe is composed of $m+1$ rows. Therefore, there is a minimum of $n/(m+1)=(2m+2)/(m+1)=2$ disks worth of parity, which is the optimal amount. If n is made larger than $2m+2$, then there is more than the minimum parity in the parity array, but the overhead and redundancy may be maintained by keeping m constant.

It should be noted that for the Corbett-Park scheme, the sizes of the blocks used in the parity computations do not have to match the sizes of any system blocks. Therefore, the blocks used for parity computation can be chosen to be some convenient size. For example, assume it is desired that each recurrence of the parity assignment pattern contain exactly 4 kilobytes (kB) of data from each disk. The sizes of the blocks used for parity computation can thus be defined as $4 \text{ k}/(m+1)$, which works well if m=3, 7 or 15 when the block size is a larger power of two, such as 4 k (4096) bytes.

The result of the Corbett-Park parity assignment construction technique is that within each row of a stripe, the data block on disk i belongs to parity sets $(i+j) \bmod n$ and $(i+k) \bmod n$, where $j \neq k$, $0<j<n$ and $0<k<n$. The parity block for parity set p is stored on disk p, wherein $0 \leq p<n$. The difference between values j and k is a parity delta, wherein a parity delta is the difference in value modulo the number of disks between two parity sets to which a data block belongs. Note that this form of modulo arithmetic is preferably "wrap around" addition, which is similar to discarding carries in an XOR operation.

Specifically, parity offset is defined as, in a row, the differences j and k between a disk number d and the parity sets to which a block belongs, such that $\text{set1}=(d+j) \bmod n$ and $\text{set2}=(d+k) \bmod n$. Here, j and k are the parity offsets. Parity offsets are between 1 and n−1, inclusive. Parity delta, on the other hand, is defined as the difference, modulo n, between the parity offsets j and k for a row of blocks. The parity deltas for a row are (j−k)mod n and (k−j)mod n. Parity deltas are between 1 and n−1, inclusive, and n/2 is not allowed, as are other factors of n depending on the depth of the parity blocks per stripe in the relocated parity arrangement.

Among all the m rows of data blocks, all the deltas must be unique. Furthermore, in cases of even values of n, delta of n/2 is not allowed. Therefore, for m rows, there are 2×m unique deltas required. Given n−1 possible deltas in the case of odd n, and n−2 possible deltas in the case of even n, there is a restriction on the maximum size of m and, hence, on the minimum redundancy ratio for a given number of disks. The assignment of two unique parity deltas to each row of a stripe as described herein ensures five conditions:

1. Each data block belongs to two unique parity sets.
2. The m data blocks on each disk belong to 2×m different parity sets.
3. No data block on a given disk belongs to the parity set of the parity block on that disk.
4. All parity sets are of the same size. Since each data block belongs to exactly the minimum number 2 parity sets, a corollary is that all parity sets are of minimum size.
5. On each disk, there is at least one parity set that is not represented by either a data or parity block.

These conditions are necessary, but not sufficient to ensure that the array contents can be reconstructed after two device failures. The 5th condition is key to reconstruction. When two disks are lost, there are always at least two parity sets for which only one block is lost and which allow for reconstruction of the missing block. If n=2m+2, there are exactly two parity sets that are only missing one member. If n>2m+2, there are more than two parity sets that are only missing one member and, in fact, some parity sets may be complete and require no reconstruction. Therefore reconstruction can always begin by reconstructing two of the missing blocks, one from each of the failed disks. If the reconstructed blocks are data blocks, then each reconstructed data block allows reconstruction of the missing block from another parity set, since each data block belongs to is two parity sets. Each reconstruction "chain" is continued until a parity block is reconstructed.

FIG. 1 is a block diagram of a prior art 4-disk array 100 configured in accordance with the Corbett-Park distributed parity arrangement. Each disk is assigned parity and data blocks that are organized into stripes and assigned to parity sets. For example, each stripe contains two blocks, a data (D) block and a parity (P) block, with the parity and data block assignment patterns repeated for each stripe. Each parity block stores the parity for one parity set and each parity set has exactly one parity block. All parity sets are of equal size and are composed, in addition to the parity block, of several data blocks. Each data block is defined to be a member of two parity sets. No two data blocks in the array are both members of the same two parity sets. No more than one data block or parity block on any given disk belongs to any one parity set.

In the case of any single failure, no parity set misses more than one block and therefore all parity sets, and consequently all missing blocks, can be reconstructed. If any one of the disks fails, the lost data and parity blocks can be reconstructed, since at most one block is missing from all parity sets. Moreover, if any two disks fail, all the missing blocks can be generated from the remaining parity and data on the other two disks.

For example, if disks 0 and 1 fail, parity sets 1 and 2 are each missing two blocks and cannot be reconstructed immediately. However, each parity set 0 and 3 is missing only one block and therefore the missing blocks of these parity sets can be reconstructed. Reconstructing data block D23 (the missing data block from parity set 3) results in the reconstruction of a data block member of parity set 2 which, in turn, allows reconstruction of data block D12 on disk 0. By reconstructing data block D12, the parity block of parity set 1 on disk 1 can be reconstructed. Note that the parity blocks end the reconstruction chains. That is, for a double failure (two disk failures) there are always two reconstruction chains; recovery is effected by reconstructing the data blocks prior to the parity blocks of those chains, and then reconstructing the two parity blocks of the two failed disks.

Assume now that disks 0 and 2 fail. Each parity set 0 and 2 is missing two blocks, while each parity set 1 and 3 is missing only one block. Therefore, the missing blocks of parity sets 1 and 3 can be reconstructed immediately. In particular, the missing data block D12 from parity set 1 can be reconstructed which enables reconstruction of parity block 2 on disk 2. Similarly, missing data block D30 from parity set 3 can be reconstructed, which enables reconstruction of parity block 0 on disk 0. Therefore, there are again two chains that are reconstructed starting with the missing data block and ending with the parity block.

FIG. 2 is a block diagram of a prior art 6-disk array 200 configured in accordance with the Corbett-Park distributed parity arrangement. Each disk is divided into data and parity blocks that are further organized into stripes. Each stripe contains two data blocks and one parity block, and there is an optimal amount of parity information equivalent to two disks worth. Each data block belongs to two parity sets and there is only one (at most) representative member of each parity set on each disk. Notably, each disk is missing one parity set and the missing parity set is different among all the disks. Furthermore, each row of blocks within each stripe has a different parity delta. For example, row 1 has a parity delta of Δ1 and row 2 has a parity delta of Δ2. The same delta is not allowed on two different rows because it renders the system vulnerable to disk failures that distance apart.

Specifically, the Corbett-Park construction technique specifies that every row of data blocks in the parity array has a different parity delta value and that no row's delta value equals n/2. For example, in a 6-disk array, no row has a delta value of 3 (Δ3); similarly in a 10-disk array, no row has a delta value of 5 (Δ5). A parity delta cannot have a value of n/2 there cannot be a "harmonic" of parity set assignments to a data block within an array. It should be noted, however, that each row essentially has a pair of parity delta values. That is, in the case of a 10-disk array, a delta value of Δ3 is equivalent to a delta value of Δ7, and a delta value of Δ4 is equivalent to a delta value of Δ6. Similarly, in a 6-disk array, a delta value of Δ1 is equivalent to a delta value of Δ5 and a delta value of Δ2 is equivalent to a delta value of Δ4.

The Corbett-Park construction technique also requires finding a vector of n elements containing two each of the symbols from 1 to m that represent the data blocks, one symbol for parity (e.g., −1) and another set of symbols for null values (e.g., 0). The object is to find an n element vector that allows a complete marking of all symbols in the vector and all super-positions of the vector on itself. A vector that successfully meets the criteria corresponds to a solution of the parity assignment problem for a given n and m that allows recovery from any double disk failure.

FIG. 3 is a table 300 illustrating construction of parity assignments in a parity array from a successful vector in accordance with the Corbett-Park construction technique. The vector is {−1, 1, 0, 2, 2, 1}, which is one of four unique solutions for n=6, m=2 (discounting congruent solutions).

Each column of the table represents a disk and each row represents a parity set. The positions of the symbols in each column indicate the assignment of the data blocks 1 and 2, along with the parity block −1, to a parity set in that disk. Symbol 1 represents the data blocks in row 1 and the symbol 2 represents the data blocks in row 2 of a stripe. The data and parity blocks may be arranged in any order within each disk. The parity assignment vector is rotated by one position in each disk ensuring that it occupies all n possible positions in the n disk array. FIG. 4 is a block diagram illustrating the parity assignment pattern resulting from the construction technique.

As noted, the Corbett-Park technique provides a means for assigning data blocks to parity sets in a distributed parity configuration having an optimal amount or sub-optimal amount of parity and a chosen redundancy ratio. That is, for a given number of disks, an optimal amount of parity is chosen to be equal to 2/n. However for odd numbers of disks n there are solutions that are sub-optimal (i.e., more than two disks worth of parity) but that operate correctly. For example, if n=7 and each disk is divided into three blocks (two data blocks and one parity block), there is a total of 7/3 of parity which is greater than two disks worth and thus a sub-optimal solution resulting in increased redundancy. Increasing redundancy has two effects: (1) the size of the parity sets is smaller than the maximum allowed for a given number of disks, thus effectively "declustering" the parity. As n increases, there are more parity sets that are not affected at all by the failures. Particularly in the more common case of single failures, this might result in fewer disk read operations during reconstruction. (2) There are more than two parity sets that only lose one block in the event of the failures, increasing the parallelism possible during reconstruction.

A disadvantage of increasing redundancy is that there is more total parity information than the minimum two disks worth. However, in a large system, there will be many parity arrays and hence much more than the minimum two disks worth of parity in the entire system. Larger values of m allow more data blocks per parity block, decreasing the amount of redundant space on disk. Yet, the parity set size is always 2m+1, including data and parity blocks. Therefore, the larger m, the more computation needed to compute each parity block, both during encoding and decoding (i.e., construction and deconstruction). Since each data block belongs to exactly two parity sets in all cases, the total amount of parity computation is always the same for the same amount of data.

SUMMARY OF THE INVENTION

The present invention comprises a concentrated parity technique for constructing an extended array that is tolerant of any one or two storage device failures and that enables storage of more than one parity block on each storage device of the array. The concentrated parity technique uses a distributed parity assignment of data blocks to parity sets, with a restriction that precludes certain parity deltas. Yet, this restriction enables construction of the extended array having data blocks stored on a first set of devices that is disjoint from a second set of devices storing parity blocks, to thereby enable storage of more than one parity block per stripe on a single device.

According to the inventive technique, the parity blocks, separated by the precluded parity deltas, can be stored on similar devices. For example in all cases where n is an even number of devices, parity blocks that are n/2 apart (parity delta) can be stored on the same device of the extended array. By further restricting other parity deltas, any number of parity blocks may be stored on the same device. The concentrated parity arrangement may, however, create an unbalanced parity stripe "array" of data and parity blocks across the devices. According to another aspect of the present invention, a plurality of unbalanced parity stripe arrays may be combined to thereby produce a single balanced parity "super-stripe" array across the devices.

Advantageously, the inventive concentrated parity technique utilizes parity protection to provide an extended array that protects against all single and double failures, where a single failure is a loss of one device, such as a disk, and a double failure is a loss of two devices at any time. The inventive technique further allows the extended array to be configured with a smaller number of data devices and, as additional data devices are needed, those devices can be added individually or in small groups without moving any data blocks or reconfiguring or re-computing any parity. Although the extended array arrangement may result in an increase in redundancy, the inventive technique enables a corresponding increase in parallelism during reconstruction of the failed disk(s).

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 7 is a block diagram of data and parity blocks of a balanced stripe array according to a concentrated parity technique of the present invention;

FIG. 8 is a block diagram illustrating parity assignments for a disk array in accordance with the present invention;

DETAILED DESCRIPTION OF AN ILLUSTRATIVE EMBODIMENT

Figure 5:
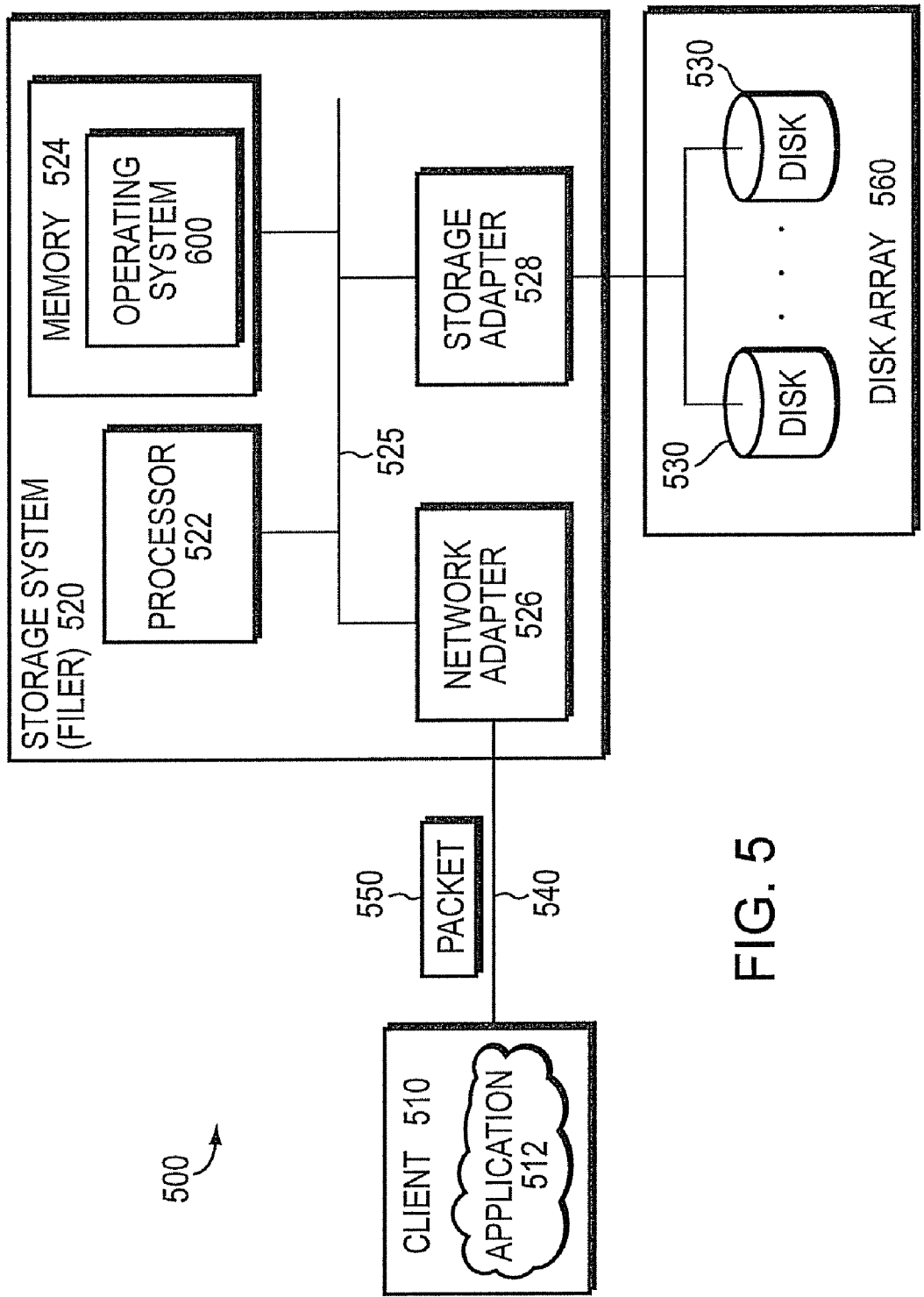
FIG. 5 is a schematic block diagram of an environment including a file server that may be advantageously used with the present invention.

FIG. 5 is a schematic block diagram of an environment 500 including a file server, such as a network storage appliance, that may be advantageously used with the present invention. The file server or filer 520 is a computer that provides file service relating to the organization of information on storage devices, such as disks 530 of a disk array 560. The filer 520 comprises a processor 522, a memory 524, a network adapter 526 and a storage adapter 528 interconnected by a system bus 525. The filer 520 also includes a storage operating system 600 that implements a file system to logically organize the information as a hierarchical structure of directories and files on the disks.

In the illustrative embodiment, the memory 524 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 600, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used is for storing and executing program instructions pertaining to the inventive technique described herein.

The network adapter 526 comprises the mechanical, electrical and signaling circuitry needed to connect the filer 520 to a client 510 over a computer network 540, which may comprise a point-to-point connection or a shared medium, such as a local area network. The client 510 may be a general-purpose computer configured to execute applications 512. Moreover, the client 510 may interact with the filer 520 in accordance with a client/server model of information delivery. That is, the client may request the services of the filer, and the filer may return the results of the services requested by the client, by exchanging packets 550 encapsulating, e.g., the Common Internet File System (CIFS) protocol or Network File System (NFS) protocol format over the network 540.

The storage adapter 528 cooperates with the storage operating system 600 executing on the filer to access information requested by the client. The information may be stored on any type of attached array of writeable media such as video tape, optical, DVD, magnetic tape, bubble memory and any other similar media adapted to store information, including data and parity information. In the illustrative embodiment described herein, however, the information is preferably stored on the disks 530 of array 560. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 522 (or the adapter 528 itself) prior to being forwarded over the system bus 525 to the network adapter 526, where the information is formatted into a packet and returned to the client 510.

Storage of information on array 560 is preferably implemented as one or more storage "volumes" that comprise a cluster of physical storage disks 530, defining an overall logical arrangement of disk space. Each volume is generally associated with its own file system. The disks within a volume/file system are typically organized as one or more groups of Redundant Array of Independent (or Inexpensive) Disks (RAID). RAID implementations enhance the reliability/integrity of data storage through the redundant is writing of data "stripes" across a given number of physical disks in the RAID group, and the appropriate storing of parity information with respect to the striped data.

To facilitate access to the disks 530, the storage operating system 600 implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. In the illustrative embodiment described herein, the storage operating system is preferably the NetApp® Data ONTAP™ operating system available from Network Appliance, Inc., Sunnyvale, Calif. that implements a Write Anywhere File Layout (WAFL™) file system. It is expressly contemplated that any appropriate file system can be used, and as such, where the term "WAFL" is employed, it should be taken broadly to refer to any file system, database or data storage system that is otherwise adaptable to the teachings of this invention.

Figure 6:
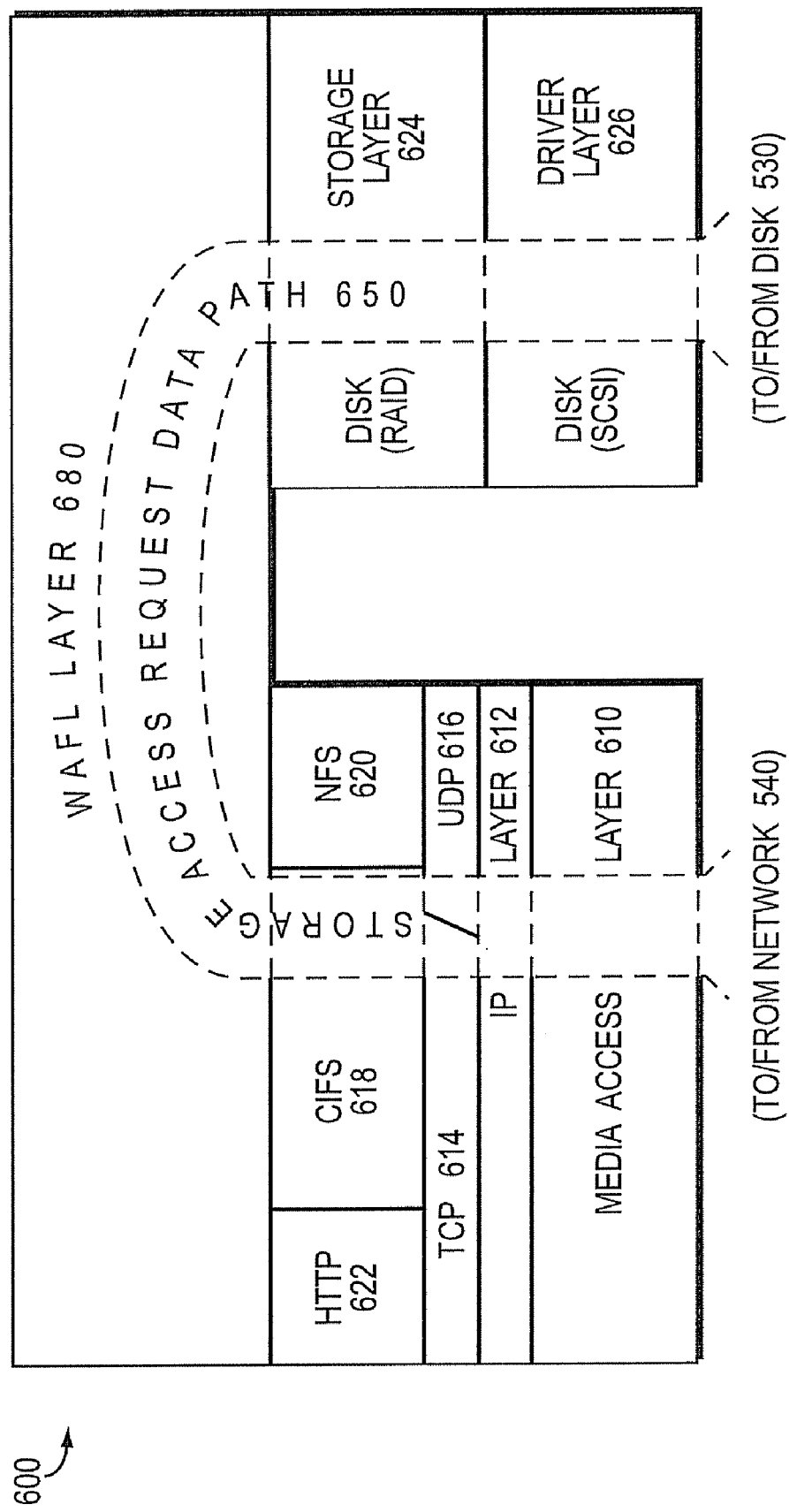
FIG. 6 is a schematic block diagram of a storage operating system including a write anywhere file layout (WAFL) file system layer that may be advantageously used with the present invention.

FIG. 6 is a schematic block diagram of the Data ONTAP operating system 600 that may be advantageously used with the present invention. The storage operating system comprises a series of software layers, including a media access layer 610 of network drivers (e.g., an Ethernet driver). The operating system further includes network protocol layers, such as the Internet Protocol (IP) layer 612 and its supporting transport mechanisms, the Transport Control Protocol (TCP) layer 614 and the User Datagram Protocol (UDP) layer 616. A file system protocol layer provides multi-protocol data access and, to that end, includes support for the CIFS protocol 618, the NFS protocol 620 and the Hypertext Transfer Protocol (HTTP) protocol 622. In addition, the storage operating system 600 includes a disk storage layer 624 that implements a disk storage protocol, such as a RAID protocol, and a disk driver layer 626 that implements a disk access protocol such as, e.g., a Small Computer Systems Interface (SCSI) protocol.

Bridging the disk software layers with the network and file system protocol layers is a WAFL layer 680 that preferably implements the WAFL file system. The on-disk is format representation of the WAFL file system is block-based using, e.g., 4 kilobyte (kB) blocks and using modes to describe the files. The WAFL file system uses files to store meta-data describing the layout of its file system; these meta-data files include, among others, an mode file. A file handle, i.e., an identifier that includes an mode number, is used to retrieve an mode from disk.

Operationally, a request from the client 510 is forwarded as, e.g., a conventional CIFS or NFS protocol packet 550 over the computer network 540 and onto the filer 520 where it is received at the network adapter 526. A network driver of the media access layer 610 processes the packet, passes it onto the network protocol layers 612-616 and CIFS or NFS layer 618, 620 for additional processing prior to forwarding to the WAFL layer 680. Here, the WAFL file system generates operations to load (retrieve) the requested data from disk 530 if it is not resident "incore", i.e., in the memory 524. If the information is not in memory, the WAFL layer 680 indexes into the mode file using the mode number to access an appropriate entry and retrieve a logical volume block number (VBN). The WAFL layer then passes the logical VBN to the disk storage (RAID) layer 624, which maps that logical number to a disk block number and sends the latter to an appropriate driver (e.g., SCSI) of the disk driver layer 626. The disk driver accesses the disk block number from disk 530 and loads the requested data block(s) in memory 524 for processing by the filer. Upon completion of the request, the filer (and operating system) returns a reply to the client 510 over the network 540.

It should be noted that the software "path" through the storage operating system layers described above needed to perform data storage access for the client request received at the filer may alternatively be implemented in hardware. That is, in an alternate embodiment of the invention, the storage access request data path 650 may be implemented as logic circuitry embodied within a field programmable gate array (FPGA) or an application specific integrated circuit (ASIC). This type of hardware implementation increases the performance of the file service provided by filer 520 in response to a file system request packet 550 issued by client 510. Moreover, in another alternate embodiment of the invention, the processing elements of adapters 526, 528 may be configured to offload some or all of the packet processing and storage access operations, respectively, is from processor 522, to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., zo that implements file system semantics and manages data access. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., server) or general-purpose computer, including a standalone computer, embodied as or including a storage system. To that end, filer 520 is hereinafter described as an exemplary implementation of a storage system 520. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystem configured to perform a storage function and associated with other equipment or systems.

The present invention comprises a concentrated parity technique that utilizes parity protection to protect against all single and double failures, where a single failure is a loss of one storage device, such as disk 530, and a double failure is a loss of two disks 530 of array 560. The novel technique is preferably implemented by the disk storage (RAID) layer 624 that assigns data blocks to parity sets in accordance with a conventional distributed parity technique. The RAID layer cooperates with the WAFL layer 680 to divide the disks 530 into data and parity blocks that are then organized as RAID is groups through the redundant writing of stripes across the disks, wherein each stripe contains data and parity blocks from each of the disks. To that end, the WAFL layer generally performs large write operations, writing or overwriting an entire stripe of a parity array at once. The contents of the stripe, including the parity blocks, are computed in memory before the stripe is written to disk.

In the illustrative embodiment of a WAFL-based file system and process, a RAID-4 implementation is advantageously employed. This implementation specifically entails the striping of data across a group of disks, and separate parity caching within selected disk(s) of the RAID group. The illustrative RAID-4 implementation of the disk array as described herein provides the flexibility to start with an under-populated disk array, and add disks individually or in small numbers until a fully populated array is achieved. This is possible because an initial situation may be assumed wherein the array has a finite number of imaginary data disks, all containing zeros. With a single parity disk, data disks can be added until the size of a stripe becomes too large to buffer effectively.

The present invention is directed to a RAID-4 style technique where all data is stored on a subset of disks in a parity group and all parity is stored on a disjoint subset of disks. This may be accomplished by first noting that all the rows of parity blocks may be removed from the original disks of the array and moved to the disjoint set of disks of the "extended" array. Such an extended array would still be tolerant of double failures because any two data disks failing would result in less loss of information than would have occurred if the parity blocks were still mixed with the data blocks. Any loss of a disk containing a parity block would similarly be easier to recover from than if both the parity and data from the original disk were lost.

Figure 1:
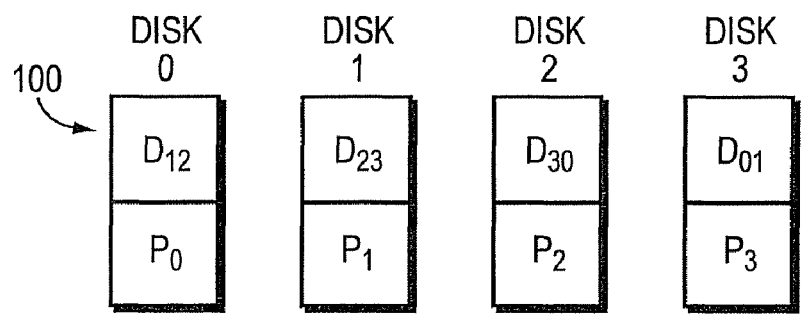
FIG. 1 is a block diagram of a first, prior art disk array configured in accordance with a conventional distributed parity arrangement.
Figure 2:
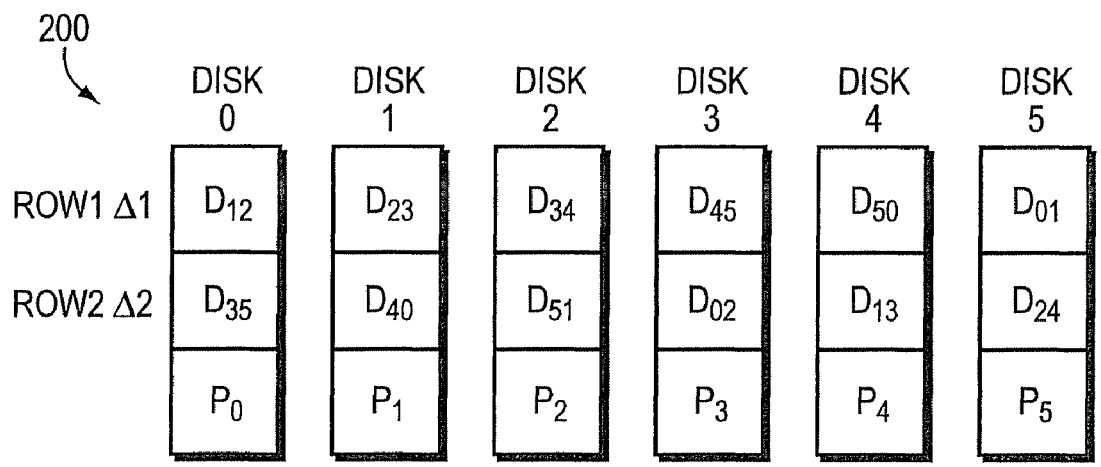
FIG. 2 is a block diagram of a second, prior art disk array configured in accordance with the conventional distributed parity arrangement.
Figure 3:
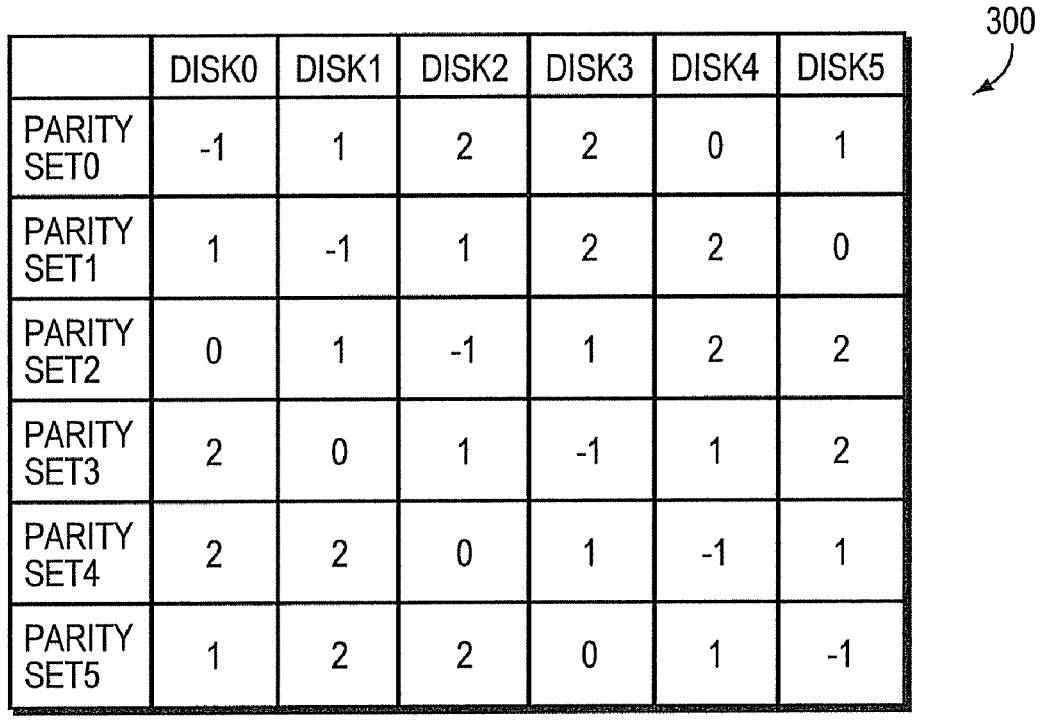
FIG. 3 is a table illustrating construction of parity assignments in a parity array from a vector in accordance with a prior art construction technique.
Figure 4:
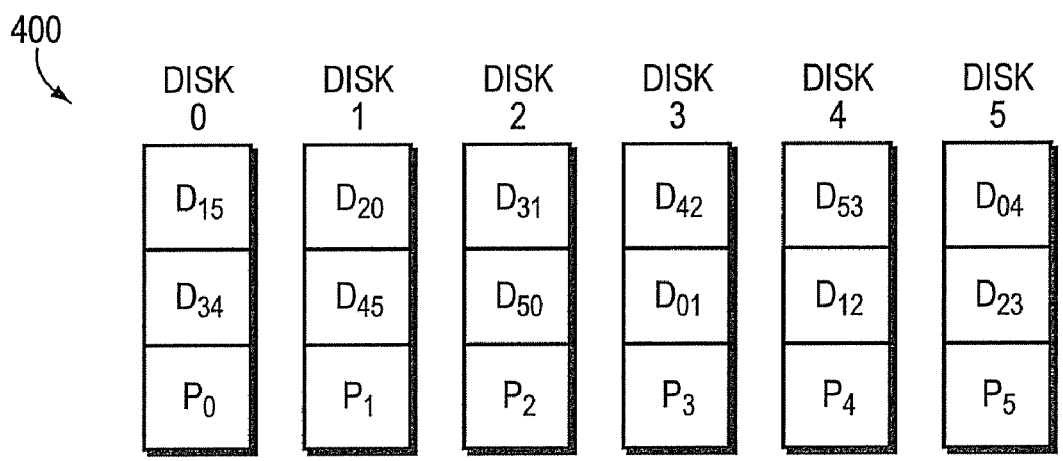
FIG. 4 is a block diagram illustrating a parity assignment pattern resulting from the prior art construction technique.

Therefore, the present invention comprises a concentrated parity technique that enables construction of an extended array of disks having a data block portion that is maintained on an original set of disks, while a parity block portion of the array is contained on a physically separate, i.e., disjoint, set of disks. Within the set of parity disks that is disjoint from the set of disks storing the data blocks, the invention enables storage is of more than one parity block on each disk. Referring to the parity assignment pattern for the 6-disk array of FIG. 2, a redundancy ratio of 1/3 is provided, i.e., one third of the disk storage is occupied by parity. The disks employ a distributed parity configuration as indicated by one parity block and two data blocks per disk (per stripe). One way of achieving the novel concentrated parity arrangement is to take all the parity blocks P0-P5 and zo place them on six parity disks that are disjoint from the original six disks containing the data blocks. Here, the redundancy ratio of the novel arrangement remains the same. However the amount of parity is not optimal with respect to the total disk storage occupied by parity as 6 disks, instead of 2 disks, contain parity.

Although the concentrated parity configuration described above is tolerant of double failures, it may create unbalanced disk lengths with respect to the blocks per disk per stripe. According to an aspect of the invention, the parity blocks may be further combined and arranged such that all disks contain the same number of blocks (e.g., two) to thereby provide a balanced stripe "array" across the disks. FIG. 7 is a block diagram of data and parity blocks of a balanced stripe array 700 according to the concentrated parity technique of the present invention. Here, parity blocks P0 and P3 are both stored within a disk, as are parity blocks P1 and P4, and parity blocks P2 and P5. This "self-contained" stripe of data and parity may be repeated in a recurring pattern across all the disks. Notably, the combination of parity blocks represents the only functional arrangement for the 6-disk array system.

Specifically, the difference of the combined parity blocks on each parity disk is 3. A parity delta of Δ3 is prohibited for a row of data blocks because it results in a non-functional arrangement. A delta of Δ3 is non-functional (i.e., does not work) for a row of data blocks because it ascribes two data blocks having positions of exactly half the length of the array apart to exactly the same parity set assignments. If two disks half the length of the array apart were lost, then two data block members of the same two parity sets are lost, thereby obviating recovery of the lost data. Row 1 of the parity array thus has a delta of Δ1 and row 2 has a delta of Δ2.

The assignment prohibition of certain parity deltas to data blocks described above also applies to the conventional Corbett-Park distributed parity arrangement. However, it is this prohibition (restriction) that provides the basis of the novel concentrated parity variant of that conventional technique. In other words, the conventional Corbett-Park construction technique specifies that for an even number of disks n, there are no deltas of n/2. By excluding a parity delta value of n/2 from assignments to data blocks, the present invention allows certain parity blocks (i.e., those having a difference of n/2) to be combined on the same disk, since no data block can be in both of the parity sets separated by n/2.

For example in the case of a 6-disk system, the parity blocks can be removed from the original disks and combined on disjoint disks only if the parity block parity assignments are separated by 3, while the data block parity assignments are maintained as originally assigned. Thus, the present invention allows parity blocks having a delta of Δ3 to be combined on parity disks 6-8 of array 700. Note that when a parity disk is lost, two parity blocks from each stripe are lost. According to an aspect the inventive technique, the two lost parity blocks should not belong to the two parity sets to which any disk block belongs. This aspect of the invention is guaranteed because no disk block is assigned to two parity sets that are separated by a delta of Δ3. This aspect is also key to the inventive concentrated parity technique, particularly for a write anywhere file system that utilizes a RAID-4 style concentrated parity arrangement. Yet, it should be noted that the novel concentrated parity arrangement may apply to any type of file system, including a write in-place file system, having any type of attached array of any type of writeable persistent storage media, such as video tape, optical, DVD, magnetic tape and bubble memories.

According to another aspect of the present invention, more than two parity blocks may be combined onto a single parity disk within each stripe. By precluding the assignment of certain deltas to data blocks that are a factor of n (where n=the total number of data disks in the array), the corresponding parity blocks may be grouped together. Ideally, it is desirable to combine the parity blocks into n/m disks with m parity blocks on each disk, as this would provide a match between the size of the data disks and the size of the parity disks. The recurring pattern would have m blocks on each disk, either data or parity. For certain factors $f_1$, $f_2$ of n, where $f_1 \times f_2 = n$, solutions are available that allow is placement of $f_1$ parity blocks on $f_2$ dedicated parity disks. The restriction is that the pair of deltas in each row of data blocks must obey the following relationship, where i and j are the two parity deltas for a row:

$(i-j) \bmod n \neq kf_2$, for any value of k such that $0 < kf_2 < n$

In other words, the restriction specifies no $\Delta = kf_2$ for a row of data blocks. A feature of the inventive technique is that once values of n and m are established, it is necessary to find only one operational combination of parity deltas. That combination can be used in the encoding process in all arrays. It can be shown that the restriction described herein results in a configuration where no parity disk contains two parity blocks to which any one data block belongs.

As a result, the loss of any one parity disk and any one data disk can be tolerated. This is because, at most, one data block is lost from each of the two parity sets to which each data block belongs, as per the conditions of array construction applied from the original Corbett-Park scheme. In addition, no more than one of the two parity blocks is lost to which each lost data block belongs, as per this technique. So, the lost data disk can be first reconstructed from surviving data and parity, and then the lost parity disk can be reconstructed from surviving and reconstructed data.

If two parity disks are lost, reconstruction is possible simply by recalculating the lost parity blocks from the surviving data blocks, since all the data blocks must have survived in any two disk failures where the two failed disks are both parity disks.

If two data disks are lost, then less information is lost than would have been lost in the corresponding loss of two disks in the original Corbett-Park scheme. In fact, the same data blocks and none of the parity blocks would have been lost. Thus, by applying the first steps of the Corbett-Park recovery algorithm, all of the lost data blocks can be reconstructed.

For example, assume a 12-disk array with redundancy of 1 parity block for every 4 data blocks. This array can be configured as a RAID-5 style array according to the original Corbett-Park scheme with 4 data blocks and 1 parity block in each recurrence of the parity assignment pattern per disk. According to the invention, the parity blocks can be stripped from the 12-disk array and placed, 4 blocks per disk, on 3 additional parity disks, thereby creating a RAID-4 style array. This resulting 15-disk array includes 12 data disks and 3 parity disks. Although there is more than the minimum two disks of parity in the array, the ratio of parity to data is unchanged from the original 12 disk array and the parity set size is unchanged. There are more disks but there is also more space for data on the original 12 disks. An advantage of this technique is that the array can be configured with a smaller number (than 12) of data disks and, as additional data disks are needed, those disks can be added individually or in small groups without moving any data blocks or reconfiguring or re-computing any parity. The novel technique simply "assumes" that all 12 data disks are present from the beginning and that any disks that aren't actually present in the array are filled with, e.g., zero values.

An example of the restriction specified by the inventive technique is as follows. Assume that a 15-disk array is configured as 12 data disks and 3 parity disks. Since $f_2=3$ and no $\Delta = kf_2$ is allowed, deltas having a value of Δ3, Δ6 or Δ9 are not allowed for assignment of data blocks to parity sets. Given that restriction, parity blocks P0, P3, P6 and P9 can be combined onto one parity disk, parity blocks P1, P4, P7, P10 can be combined onto another parity disk and parity blocks P2, P5, P8, P11 can be combined onto a third parity disk. In essence, the restriction specifies that, depending upon the number of parity disks ($f_2$), there cannot be any multiple of that number ($kf_2$) used as a parity delta for the data blocks. By precluding data block parity set assignments of multiples of the parity disk (e.g., 3, 6 and 9 for a 12-disk array), the inventive concentrated parity technique allows combining of parity blocks having those differences, modulo n, on a single disk.

FIG. 8 is a table 800 illustrating a solution of parity assignments for a 15-disk array having 12 data disks and 3 parity disks, with a redundancy ratio of 4 to 1, in accordance with the present invention. Each row represents the contents of one row of the recurring pattern of parity assignment on disk. The numbers associated with each data and parity block are the parity sets to which that block is assigned. If each of the blocks in the table is 1 k, for example, then the pattern recurs every 4 k bytes and the entire stripe, is including parity, may be computed in memory by buffering 15×4=60 k bytes of data. In addition, all parity for that stripe may be computed in memory 524 prior to performing one large write operation to the disks.

In each data disk, 4 of the 12 parity sets are not represented. Also, no parity set is represented twice on a disk. Furthermore, no data block belongs to two parity sets for which the parity blocks are stored on the same parity disk. As noted, this is key to the success of the inventive technique, as no more than two members of any parity set can be lost with just two disk failures and at least 4 parity sets will always lose only one member. From there, it may be demonstrated that the loss of any pair of disks can be recovered by sequentially reconstructing data blocks as missing members of each parity set are filled.

As an example of a reconstruction sequence, assume that disks 0 and 1 are lost to failure. Two members of parity sets 2, 3, 4, 9, 10 and 11 are lost and one member of parity sets 0, 1, 5 and 8 is lost. Blocks B1,9 and B8,10 from disk 0 can immediately be reconstructed, as can block B5,0 from disk 1. Completing the reconstruction of block B1,9 allows the reconstruction of block B9,11, and then block B4,11. Completing block B8,10 allows reconstruction of block B2,10, then block B2,3, then block B3,4, thereby completing the reconstruction of the lost data. Note that the parity deltas among all the rows are unique. This is a general restriction on the overall solution to the concentrated parity technique. Note also that in this parity assignment, there are no parity deltas of $\Delta 3$, $\Delta 6$ or $\Delta 9$ in any row of data blocks. This, in turn, allows the grouping of four different parity sets on each parity disk.

According to the inventive concentrated parity technique, it is possible to construct a "balanced" array where all the disks of the array have the same amount of information contained thereon, whether data or parity. For example, referring to the concentrated parity configuration of FIG. 7, each of the 9 disks, (6 data and 3 parity disks) contain the same amount of information (two blocks) for each stripe across the disks. When the stripe is repeated multiple times across the disks, the disks are filled uniformly and, accordingly, all the disks may be of the same size, thereby providing a balanced array. Notably, the array 700 is balanced after one repetition of a stripe.

However, assume that for a 10-disk array, there are 5 blocks per disk per stripe that results in 5 rows of blocks per stripe across the 10 disks of the array. Assume further that the last row of blocks across the 10 disks comprises parity blocks according to the original Corbett-Park scheme. Then assume that those blocks are removed from the 10 data disks and placed on a disjoint set of 5 parity disks, wherein each parity disk contains two parity blocks. The resulting array comprises 10 data disks, each with 4 blocks per stripe, and 5 parity disks, each with 2 blocks per stripe, that collectively form a first unbalanced parity stripe array. It should be evident to those skilled in the art that such a parity arrangement can be constructed in accordance with the techniques of this invention and that this array will tolerate any two disk failures.

Figures 9, 10:
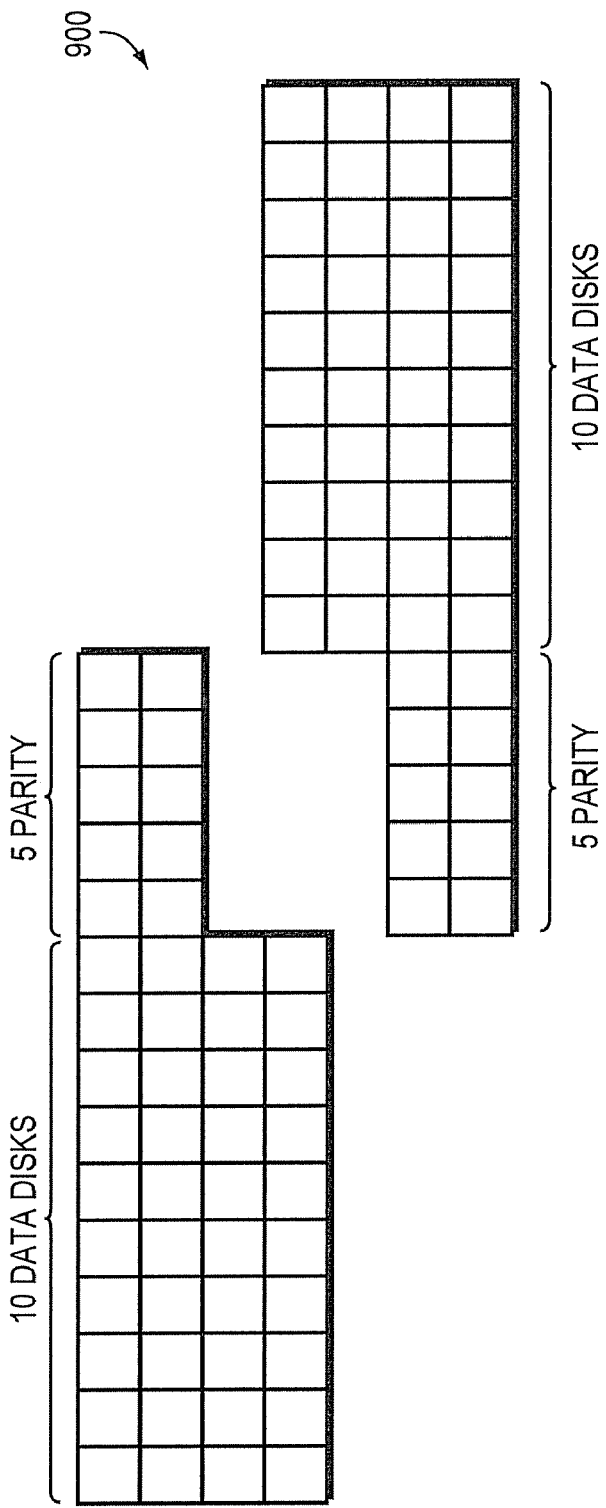
FIG. 9 is a block diagram illustrating a balanced parity super-stripe array in accordance with the invention.
FIG. 10 is a block diagram illustrating a balanced parity super stripe array configuration adapted for large write operations in accordance with the present invention.

In accordance with an aspect of the present invention, a second unbalanced parity stripe array having 10 data disks, each with 4 blocks, and 5 parity disks, each with 2 blocks, may be combined with the first unbalanced parity stripe array to thereby form a balanced parity "super-stripe" array. FIG. 9 is a block diagram illustrating a balanced parity super-stripe array 900 in accordance with the invention. The resulting balanced super-stripe array comprises 25 disks, 20 of which are data disks and 5 of which are parity disks, wherein each disk has 4 blocks per stripe.

Thus, if the depth of the parity disks is some integer fraction of the depth of the data disks, the parity information from two or more different disk arrays can be combined onto one set of the parity blocks. In an alternate embodiment of the invention, the parity from each of the unbalanced parity stripe arrays can be combined onto the same 5 parity disks, interleaving parity from each disk array in groups of two blocks. The entire set of 25 disks may be considered as a single array for large write operation purposes, writing out a large stripe 4 blocks deep by 25 blocks wide with 80 data blocks on 20 data disks and 20 parity blocks on 5 parity disks. FIG. 10 is a block diagram illustrating such a balanced array configuration 1000 adapted for large write operations in accordance with the present invention.

While there has been shown and described an illustrative embodiment for constructing an array having a data block portion that is maintained on a set of storage devices that is disjoint from the set of devices holding the parity block portion, it is to be understood that various other adaptations and modifications may be made within the spirit and scope of the invention. For example, in yet another alternate embodiment of the invention, three or more unbalanced parity stripe arrays may be combined to form a zo balanced parity super-stripe array. Assume an unbalanced parity stripe array wherein each of the data devices (disks) has 6 data blocks and each of the parity devices (disks) has 2 data blocks. By combining three of these unbalanced parity stripe arrays according to the inventive technique, a balanced parity super-stripe array may be formed. Notably, the invention does not require that all of the constituent disks of a large balanced array be physically contiguous/adjacent, although they must be logically organized.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for constructing an array of storage devices, comprising:
   establishing a selected number of storage devices in the array of storage devices, each selected storage device storing data in blocks;
   establishing a selected number of data storage blocks for a parity block;
   establishing a plurality of parity sets, a parity set having the number of data blocks and having a set parity block, the parity sets chosen so that each data storage block is in more than one parity set;
   computing the set parity block for each parity set; and
   storing each set parity block on a storage device of the array selected to store parity blocks (hereinafter a parity storage device for each of the plurality of parity sets), to store more than one parity block on each parity storage device, with an exception that two parity blocks for a same data storage location are precluded from being stored on the same is parity storage device.

2. The method of claim 1, further comprising:
   establishing each data block in two or more parity sets.

3. The method of claim 1, further comprising:
   assigning a data block at a data storage location indicated by "i" to a first parity set indicated by "j" and to a second parity set indicated by "k", so that there are "p" parity sets, as determined by the number of data storage blocks for a parity block;
   assigning a selected block to both parity set i+k mod(N) and to parity set (j+k) mod(N), where mod(N) represents modulo N, and where N is the number of data storage devices;
   computing a parity delta, where the parity delta is j-k for a row of data; and
   having a selected parity delta, where two parity blocks having the same delta are not stored on the same storage device.

4. The method of claim 1, further comprising:
protecting against all single device failures by implementing one parity block for each data block, where a single failure is the loss of one storage device.

5. The method of claim 1, further comprising:
protecting against all double device failures by implementing two parity blocks for each data block, where a double device failure is the loss of two storage devices.

6. The method of claim 1, further comprising:
adding additional data storage devices without moving any data blocks.

7. The method of claim 1, further comprising:
adding additional storage devices without reconfiguring any parity.

8. The method of claim 1, further comprising:
adding additional storage devices without re-computing any parity.

9. The method of claim 1, further comprising:
using a disk as the data storage device.

10. The method of claim 1, further comprising:
using a plurality of disks as the data storage device.

11. The method of claim 1, further comprising:
using a plurality of disks arranged in a RAID configuration as the data storage device.

12. The method of claim 1, further comprising:
using a memory as the data storage device.

13. The method of claim 1, further comprising:
using a magnetic tape as the data storage device.

14. The method of claim 1, further comprising:
using a computer writeable media as the data storage device.

15. The method of claim 1, further comprising:
using a media adapted to store information contained within the data and parity blocks as the storage device.

16. A computer operated data storage system apparatus, comprising:
a selected number of storage devices established as an array of storage devices, each selected storage device storing data in blocks;
a selected number of data storage blocks established for a parity block;
a plurality of parity sets, a parity set having the number of data blocks and having a set parity block, the set the parity sets chosen so that each data storage block is in more than one parity set;
the data storage system configured to compute the set parity block for each parity set; and
the data storage system configured to store each set parity block on a storage device of the array selected to store parity blocks (hereinafter parity storage device for each of the plurality of parity sets), to store more than one parity block on each parity storage device, with an exception that two parity blocks for a same data storage location are precluded is from being stored on the same parity storage device.

17. The apparatus of claim 16, further comprising:
each data block is established in two or more parity sets.

18. The apparatus of claim 16, further comprising:
a data block is assigned a data storage location indicated by "i" is assigned to a first parity set indicated by "j" and is assigned to a second parity set indicated by "k", so that there are "p" parity sets, as determined by the number of data storage blocks for a parity block;
the data storage system configured to assign a selected block to both parity set i+k mod(N) and to parity set (j+k)mod(N), where mod(N) represents modulo N, and where N is the number of data storage devices;
the data storage system configured to compute a parity delta, where the parity delta is j-k for a row of data; and
the data storage system configured to have a selected parity delta, where two parity blocks having the same delta are not stored on the same storage device.

19. The apparatus of claim 16, further comprising:
the data storage system configured to protect against all single device failures by implementing one parity block for each data block, where a single failure is the loss of one storage device.

20. The apparatus of claim 16, further comprising:
the data storage system configured to protect against all double device failures by implementing two parity blocks for each data block, where a double device failure is the loss of two storage devices.

21. The apparatus of claim 16, further comprising:
the data storage system configured to add additional data storage devices without moving any data blocks.

22. The apparatus of claim 16, further comprising:
the data storage system configured to add additional storage devices without reconfiguring any parity.

23. The apparatus of claim 16, further comprising:
the data storage system configured to add additional storage devices without recomputing any parity.

24. The apparatus of claim 16, further comprising:
a disk used as the data storage device.

25. The apparatus of claim 16, further comprising:
a plurality of disks used as the data storage device.

26. The apparatus of claim 16, further comprising:
a plurality of disks arranged in a RAID configuration used as the data storage device.

27. The apparatus of claim 16, further comprising:
a memory used as the data storage device.

28. The apparatus of claim 16, further comprising:
a magnetic tape used as the data storage device.

29. The apparatus of claim 16, further comprising:
a computer writeable media used as the data storage device.

30. The apparatus of claim 16, further comprising:
a media adapted to store information contained within the data and parity blocks used as the storage device.

31. A computer readable storage media, comprising:
said computer readable storage media containing program instructions for execution on a processor for a method of constructing an array of storage devices, the program instructions for,
establishing a selected number of storage devices in the array of storage devices, each storage device storing data in blocks;
establishing a selected number of data storage blocks for a parity block;
establishing a plurality of parity sets, a parity set having the number of data blocks and having a set parity block, the parity sets chosen so that each data storage block is in more than one parity set;
computing the set parity block for each parity set; and
storing each set parity block on a storage device of the array selected to store parity blocks (hereinafter parity storage device for each of the plurality of parity sets), to store more than one parity block on each parity storage device, with an exception that two parity blocks for the same data storage location are precluded from being stored on the same parity storage device.

32. A method for constructing an array of storage devices, comprising:

dividing storage blocks of the storage devices into data blocks for storing data and parity blocks for storing parity;

assigning a plurality of data blocks to a parity set;

assigning each data block to a selected number of parity sets, where the selected number is greater than one; and storing the parity blocks to a storage device such that, (1) a parity block for a parity set cannot be on a device holding a data block of the parity set, (2) more than one parity block for the parity set assigned to a data block cannot be on the same storage device, and (3) the array is recoverable from up to a selected number of device failures.

33. The method of claim 32, further comprising:
using a disk as the data storage device.

34. The method of claim 32, further comprising:
using a plurality of disks as the data storage device.

35. The method of claim 32, further comprising:
using a plurality of disks arranged in a RAID configuration as the data storage device.

36. The method of claim 32, further comprising:
using a memory as the data storage device.

37. A data storage system apparatus, comprising:
an array of storage devices, each storage device having storage blocks divided into data blocks for storing data and parity blocks for storing parity;
a plurality of data blocks assigned to a parity set;
the data storage system configured to assign each data block to a selected number of parity sets, where the selected number is greater than one; and
the parity blocks stored to a storage device such that, (1) a parity block for a parity set cannot be on a device holding a data block of the parity set, (2) more than one parity block for the parity set assigned to a data block cannot be on the same storage device, and (3) the array is recoverable from up to a selected number of device failures.

38. The apparatus of claim 37, further comprising:
a disk used as the data storage device.

39. The apparatus of claim 37, further comprising:
a plurality of disks used as the data storage device.

40. The apparatus of claim 37, further comprising:
a plurality of disks arranged in a RAID configuration used as the data storage device.

41. The apparatus of claim 37, further comprising:
a memory used as the data storage device.

42. A computer readable storage media, comprising:
said computer readable storage media containing program instructions for execution on a processor for a method of constructing an array of storage devices, each storage device having storage blocks, the program instructions for, dividing the storage blocks into data blocks for storing data and parity blocks for storing parity;

assigning a plurality of data blocks to a parity set;

assigning each data block to a selected number of parity sets, where the selected number is greater than one; and storing the parity blocks to a storage device such that, (1) a parity block for a parity set cannot be on a device holding a data block of the parity set, (2) more than one parity block for the parity set assigned to a data block cannot be on the same storage device, and (3) the array is recoverable from up to a selected number of device failures.

* * * * *

UNITED STATES PATENT AND TRADEMARK OFFICE
CERTIFICATE OF CORRECTION

PATENT NO. : 7,970,996 B1  
APPLICATION NO. : 12/627901  
DATED : June 28, 2011  
INVENTOR(S) : Peter F. Corbett Page 1 of 1

It is certified that error appears in the above-identified patent and that said Letters Patent is hereby corrected as shown below:

In Col. 1, line 27 should read:
Mar. 18, 2008, and which application is ~~is~~ hereby incorpo- In Col. 10, line 34 should read:
e.g., 4 kilobyte (kB) blocks and using ~~modes~~ inodes to describe In Col. 10, lines 37-39 should read:
include, among others, an ~~mode~~ inode file. A file handle, i.e., an identifier that includes an ~~mode~~ inode number, is used to retrieve an ~~mode~~ inode from disk.

In Col. 10, line 51 should read:
into the ~~mode~~ inode file using the ~~mode~~ inode number to access an appro- In Col. 17, line 54 should read:
located are precluded ~~is~~ from being stored on the same Signed and Sealed this  
Twenty-seventh Day of March, 2012

David J. Kappos  
*Director of the United States Patent and Trademark Office*